(12) United States Patent
Lee et al.

(10) Patent No.: US 12,494,474 B2
(45) Date of Patent: Dec. 9, 2025

(54) ELECTRODE DRYING METHOD CAPABLE OF SUPPRESSING BINDER SWELLING AND ELECTRODE DRYING SYSTEM USING SAME

(71) Applicant: LG Energy Solution, Ltd., Seoul (KR)

(72) Inventors: Chang Ju Lee, Daejeon (KR); Sang Wook Woo, Daejeon (KR); Suk In Noh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 911 days.

(21) Appl. No.: 17/768,716

(22) PCT Filed: Aug. 20, 2021

(86) PCT No.: PCT/KR2021/011115
§ 371 (c)(1),
(2) Date: Apr. 13, 2022

(87) PCT Pub. No.: WO2022/080648
PCT Pub. Date: Apr. 21, 2022

(65) Prior Publication Data
US 2023/0155105 A1  May 18, 2023

(30) Foreign Application Priority Data

Oct. 12, 2020 (KR) .................. 10-2020-0130848

(51) Int. Cl.
*H01M 4/04* (2006.01)
*F26B 3/04* (2006.01)
(Continued)

(52) U.S. Cl.
CPC ........... *H01M 4/0471* (2013.01); *F26B 15/18* (2013.01); *H01M 4/0404* (2013.01); *F26B 3/04* (2013.01); *F26B 3/30* (2013.01); *F26B 3/347* (2013.01)

(58) Field of Classification Search
None
See application file for complete search history.

(56) References Cited

U.S. PATENT DOCUMENTS 6,381,873 B1 * 5/2002 Peremychtchev .... F26B 25/004
 427/374.1
2009/0266258 A1 * 10/2009 Reichelsheimer ...... B41F 33/14
 34/275

(Continued)

FOREIGN PATENT DOCUMENTS

CN 104641493 A 5/2015
CN 107438914 A 12/2017
(Continued)

OTHER PUBLICATIONS

International Search Report for PCT/KR2021/011115 dated Dec. 3, 2021. 3 pgs. [see p. 2, categorizing the cited references].
(Continued)

Primary Examiner — David J Laux
(74) Attorney, Agent, or Firm — Lerner David LLP

(57) ABSTRACT

An electrode drying method including: constant-rate-drying an electrode substrate coated with an electrode slurry while the electrode substrate is moved in a state that the electrode substrate makes a tilt angle with a horizontal plane; and falling-rate-drying the electrode substrate while the electrode substrate is horizontally moved. The electrode drying method and related system provide suppression of a floating phenomenon of binder elements during a drying process of an electrode and improve adhesive force between an electrode mixture layer and an electrode current collector.

11 Claims, 4 Drawing Sheets

(51) Int. Cl.
 *F26B 3/30* (2006.01)
 *F26B 3/347* (2006.01)
 *F26B 15/18* (2006.01)

(56) References Cited

U.S. PATENT DOCUMENTS

| | | | |
|---|---|---|---|
| 2012/0251734 | A1 | 10/2012 | Yamazaki |
| 2013/0040229 | A1* | 2/2013 | Grigorian .............. H01G 11/32 |
| | | | 361/503 |
| 2013/0157130 | A1 | 6/2013 | Tamaki et al. |
| 2015/0372338 | A1 | 12/2015 | Tsuchiya et al. |
| 2018/0090765 | A1 | 3/2018 | Jun et al. |
| 2018/0151883 | A1 | 5/2018 | Song et al. |
| 2019/0036105 | A1 | 1/2019 | Park et al. |
| 2022/0238884 | A1 | 7/2022 | Sato et al. |
| 2025/0125330 | A1* | 4/2025 | Kim .................. H01M 4/0471 |

FOREIGN PATENT DOCUMENTS

| | | | |
|---|---|---|---|
| JP | H08339801 | A | 12/1996 |
| JP | 2004226044 | A | 8/2004 |
| JP | 2008302300 | A | 12/2008 |
| JP | 2009037893 | A | 2/2009 |
| JP | 2010126829 | A | 6/2010 |
| JP | 2010177152 | A | 8/2010 |
| JP | 2011018594 | A | 1/2011 |
| JP | 2011129435 | A | 6/2011 |
| JP | 2012223702 | A | 11/2012 |
| JP | 2012243473 | A | 12/2012 |
| JP | 2013084383 | A | 5/2013 |
| JP | 2013089573 | A | 5/2013 |
| JP | 2015032466 | A | 2/2015 |
| JP | 2015046410 | A | 3/2015 |
| JP | 2015141822 | A | 8/2015 |
| JP | 2015-173035 | A | 10/2015 |
| JP | 2015173033 | A | 10/2015 |
| JP | 2016169059 | A | 9/2016 |
| JP | 2018514073 | A | 5/2018 |
| JP | 2018517267 | A | 6/2018 |
| JP | 2018195587 | A | 12/2018 |
| JP | 2019120466 | A | 7/2019 |
| JP | 2019184222 | A | 10/2019 |
| KR | 20130044160 | A | 5/2013 |
| KR | 20150103732 | A | 9/2015 |
| KR | 20160037763 | A | 4/2016 |
| KR | 20160047748 | A | 5/2016 |
| KR | 20160120228 | A | 10/2016 |
| KR | 20180028984 | A | 3/2018 |
| WO | WO2012026009 | A1 | 10/2013 |
| WO | 2020240746 | A1 | 12/2020 |

OTHER PUBLICATIONS

Extended European Search Report issued in Appln. No. 21873697.3 mailed Jul. 10, 2023 (7 pages).

* cited by examiner

[FIG. 1]
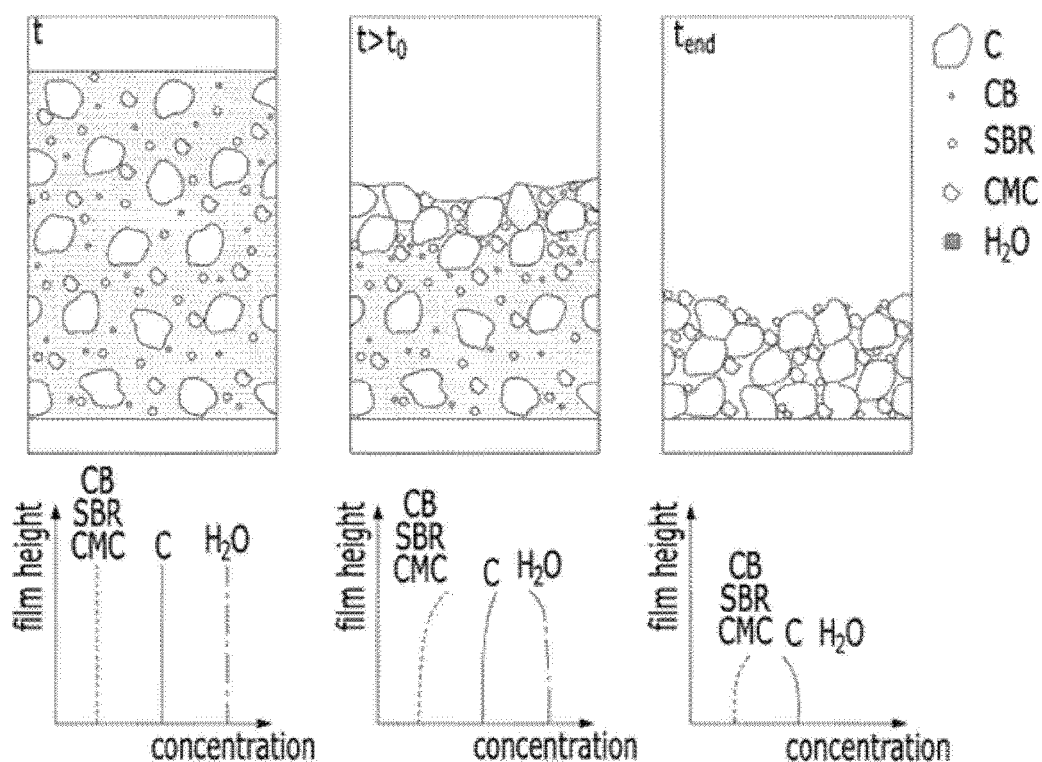

[FIG. 2]
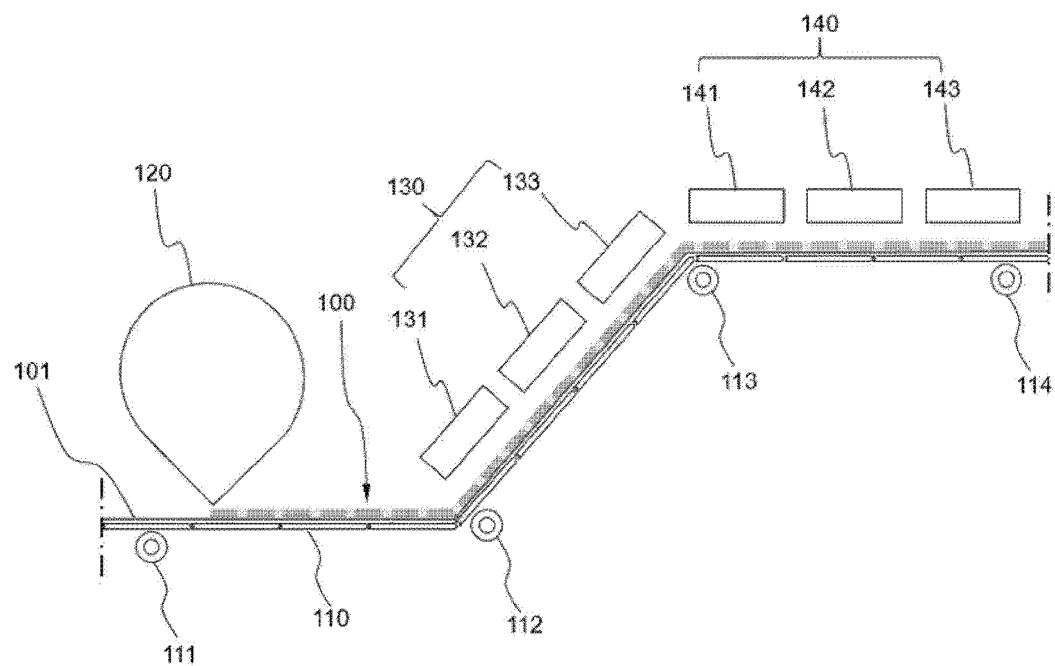

[FIG. 3]
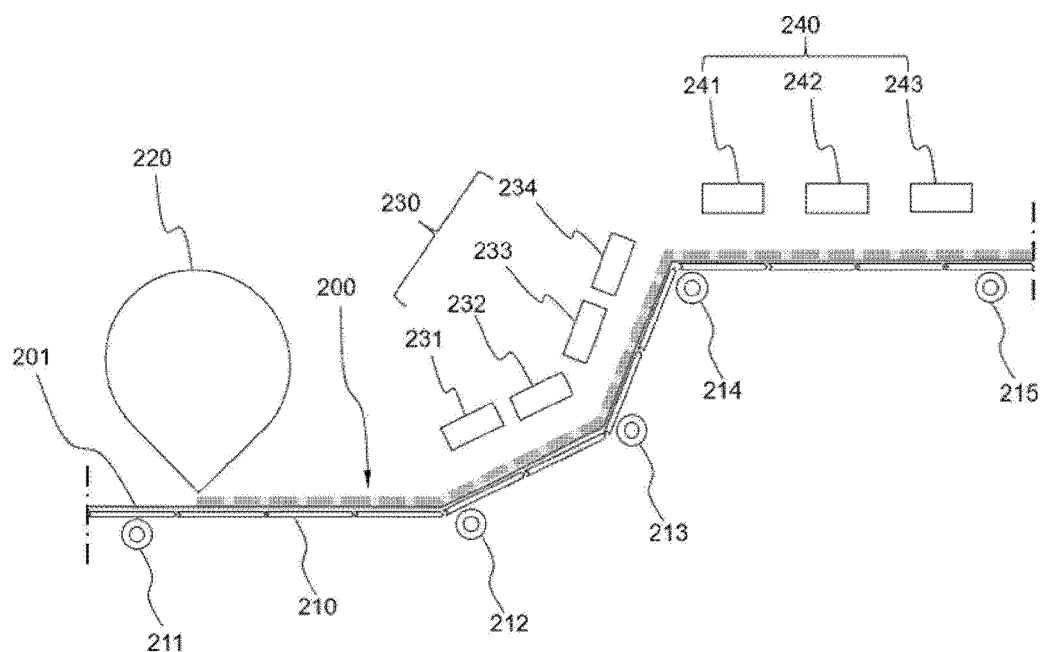

[FIG. 4]
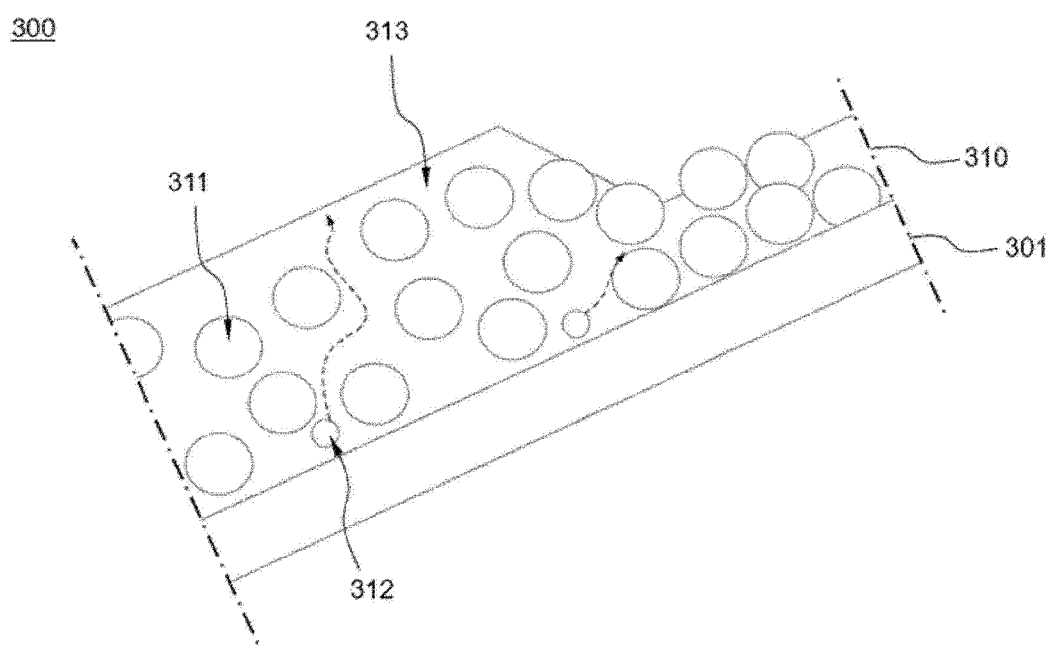

ELECTRODE DRYING METHOD CAPABLE OF SUPPRESSING BINDER SWELLING AND ELECTRODE DRYING SYSTEM USING SAME

CROSS-REFERENCE TO RELATED APPLICATIONS

This application is a national phase entry under 35, U.S.C. § 371 of International Application No. PCT/KR2021/011115, filed on Aug. 20, 2021, which claims priority from Korean Patent Application No. 10-2020-0130848, filed on Oct. 12, 2020, the disclosures of which are incorporated herein by reference.

TECHNICAL FIELD

The present invention relates to an electrode drying method for suppressing a floating of a binder by performing a constant-rate drying step in a state that a movement angle has been formed, and an electrode drying system which uses the electrode drying method.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

In addition, the secondary battery has attracted attention as an energy source of an electric vehicle, a hybrid electric vehicle, etc., which are proposed as a solution for air pollution of existing gasoline vehicles and diesel vehicles using fossil fuel. In order to be applied as an energy source of an electric vehicle, a high-power battery is required.

A secondary battery, particularly a pouch-type secondary battery, includes a positive electrode, a negative electrode, and an electrode assembly where a separator is interposed between the positive electrode and the negative electrode. The positive electrode and the negative electrode have a structure where a mixture layer is applied on a current collector. Specifically, after an electrode slurry is applied on a current collector, a drying process is performed to manufacture an electrode.

FIG. 1 shows an electrode drying process according to a conventional art. The electrode drying method of FIG. 1 illustrates a process where an negative electrode substrate, on which a negative electrode slurry has been applied, is dried while moving in a horizontal direction. Referring to FIG. 1, FIG. 1(a) shows a state where a negative electrode slurry has been applied on a copper foil which is a negative electrode current collector, FIG. 1(b) shows a state of an electrode after going through a constant-rate-drying step, and FIG. 1(c) shows a state of the electrode after going through a falling-rate-drying step. In FIG. 1(a), the negative electrode slurry contains carbon as an active material, carbon black (CB) as a conductive material, a binder (SBR, CMC), and water as a solvent. Referring to the graph at the lower side of FIG. 1(a), respective elements have been dispersed at a uniform concentration according to the height of the mixture layer. Referring to FIG. FIG. 1(b), the height of the mixture layer has been lowered to a ⅔ level of the original height as the solvent (H2O) inside evaporates during the constant-rate-drying step. At the same time, the active material (C), the conductive material (CB) and the binder (SBR, CMC) are disposed so that their concentrations gradually increase in an upward direction. Further, referring to FIG. 1(c), the active material having a high specific gravity is concentrated at the lower side, and the conductive material and the binder having a relatively low specific gravity are concentrated on the surface side.

Likewise, in the process of drying an electrode, binder elements having a relatively low specific gravity floated at the surface side. Such a floating phenomenon of the binder becomes the cause of dropping the bonding force between the current collector and the mixture layer, and the binder concentrated at the surface side drops the electrical conductivity and inhibits the movement of lithium ions.

Hence, there is a need for a technology for effectively suppressing the floating of binder elements which are generated during a drying process while not deteriorating the process efficiency.

DISCLOSURE

Technical Problem

The present invention is believed to solve at least some of the above problems. For example, an aspect of the present invention provides an electrode drying method and system for effectively suppressing a floating phenomenon of binder elements during a drying process of an electrode.

Technical Solution

The present invention provides a method for drying an electrode. In one example, a method for drying an electrode according to the present invention includes: constant-rate-drying an electrode substrate coated with an electrode slurry while the electrode substrate is moved in a state that the electrode substrate makes a tilt angle with a horizontal plane; and falling-rate-drying the electrode substrate while the electrode substrate is horizontally moved.

In one example, during the constant-rate-drying of the electrode substrate, a movement angle between the electrode substrate and the horizontal plane is in a range of 10 to 350 degrees.

In one specific example, the constant-rate-drying includes n sections (the n is an integer equal to or greater than 2), and a movement angle in a p-th section and a movement angle in a q-th section satisfy following condition 1:

$$|\theta p - \theta q| > 10(°),\qquad [\text{Condition 1}]$$

wherein the θp denotes the movement angle in the p-th section, wherein θq denotes the movement angle in the q-th section, and wherein each of the p and the q an integer between 1 and the n, and the p is different from the q.

In further another example, during the constant-rate-drying of the electrode substrate, there are a section where a movement angle between the electrode substrate and the horizontal plane increases, a section where the movement angle is maintained, and a section where the movement angle decreases.

In one example, the electrode substrate is dried by one or more of a hot air drying scheme, a heating coil drying scheme, and an induction-heat drying scheme, and a light irradiation drying scheme during the constant-rate-drying of the electrode substrate and the falling-rate-drying of the electrode substrate, respectively.

In further another example, an average drying temperature T1 during the constant-rate-drying of the electrode substrate is lower than an average drying temperature T2 during the falling-rate-drying of the electrode substrate.

In one example, the method of drying an electrode according to the present invention further includes preliminary-drying the electrode substrate by heating the electrode substrate before the constant-rate-drying of the electrode substrate.

In one example, the method of drying an electrode according to the present invention further includes: coating an electrode slurry on the electrode substrate by applying the electrode slurry, which contains an active material, a binder polymer, and a solvent, on at least one surface of the electrode substrate, wherein the coating of the electrode slurry, the constant-rate-drying of the electrode substrate, and the falling-rate-drying of the electrode substrate are consecutively or sequentially performed.

In one example, the electrode is an electrode for a pouch-type secondary battery. In a specific example, the electrode is a negative electrode.

Further, the present technology provides an electrode drying system by using the above described electrode drying method. In one example, a system for drying an electrode according to the present invention includes: a conveyor line which is moved in a state that an electrode substrate, which is obtained by applying an electrode slurry on at least one surface of an electrode current collector, is disposed on the conveyor line; and a heating unit which is located on a moving path of the conveyor line and heats an electrode sheet. The conveyor line includes: a constant-rate-drying section where the conveyor line is moved while forming a tilt angle with a horizontal plane; and a falling-rate-drying section where the conveyor line is horizontally moved, at a region where the conveyor line passes through the heating unit.

In further another example, the electrode drying system includes an angle adjusting unit which controls a movement angle of the conveyor line.

Advantageous Effects

According to an electrode drying method and system according to the present technology, it is possible to suppress a floating phenomenon of binder elements during a drying process of an electrode and improve adhesive force between an electrode mixture layer and an electrode current collector.

BRIEF DESCRIPTION OF THE DRAWINGS

FIG. 1 illustrates content and movement of elements in an electrode slurry applied on a current collector while performing a conventional electrode drying method.

FIG. 2 is a schematic diagram illustrating a process according to an electrode drying method according to one embodiment of the present invention.

FIG. 3 is a schematic diagram illustrating a process according to an electrode drying method according to another embodiment of the present invention.

FIG. 4 is a schematic diagram illustrating a change in the shape and components of an electrode slurry during a constant-rate-drying step according to one embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present technology provides an electrode drying method for effectively suppressing the floating phenomenon of binder components during the drying process. In one example, a method for drying an electrode according to the present invention includes: constant-rate-drying an electrode substrate coated with an electrode slurry while the electrode substrate is moved in a state that the electrode substrate makes a tilt angle with a horizontal plane; and falling-rate-drying the electrode substrate while the electrode substrate is horizontally moved.

As described above, binder elements having a relatively low specific gravity floated at the surface side. Such a floating phenomenon of the binder becomes the cause of dropping the bonding force between the current collector and the mixture layer, and the binder concentrated at the surface side drops the electrical conductivity and inhibits the movement of lithium ions.

In the present technology, the floating phenomenon of the binder is suppressed by allowing an electrode substrate to have a tilt angle during the constant-rate-drying step. Specifically, solvent elements remain in the mixture layer during the constant-rate-drying step, which may make the elements inside the layer float. If the electrode substrate is allowed to have a tilt angle during the constant-rate-drying step, the moving path, through which the binder elements moved to the surface side, becomes long. Through this, it is possible to suppress the phenomenon that the binder elements are concentrated at the surface side of the mixture layer during the drying process.

In one example, during the constant-rate-drying of the electrode substrate, a movement angle between the electrode substrate and the horizontal plane is in a range of 10 to 350 degrees. When the movement angle of the electrode substrate increases, the moving path, through which the binder elements are moved toward the surface side, becomes long. As such, it becomes easier to suppress the phenomenon that the binder elements float at the surface side. However, when the movement angle becomes too large, the electrode slurry may be detached from the current collector or the shape may collapse before the electrode slurry is dried. Specifically, during the constant-rate-drying step, the movement angle between the electrode substrate and the horizontal plane may be in the range of 10 to 70 degrees or 30 to 60 degrees, and as another example, it may be in the range of 100 to 160 degrees or 130 to 150 degrees. In some cases, the electrode substrate may pass through a section where the electrode substrate is rotated to be upside down or is twisted during the constant-rate-drying step. Through this, it is possible to induce the binder elements, which have moved to the surface side, to be moved to the current collector side again.

In one embodiment, the constant-rate-drying step includes n sections (n is an integer equal to or greater than 2). For examples, in the n sections, the movement angle of a p-th section and the movement angle of a q-th section satisfy the following condition 1.

$|\theta p - \theta q| > 10(°)$            [Condition 1]

Herein, the θp denotes the movement angle in the p-th section.

Herein, θq denotes the movement angle in the q-th section.

Herein, each of the p and the q an integer between 1 and the n, and the p is different from the q.

The above condition 1 means that the electrode substrate passes through two or more sections having different movement angles during the constant-rate-drying step. For example, it is possible for the electrode substrate to pass through a section having a high movement angle (30 to 80 degrees) after passing through a section having a relatively low movement angle (10 to 30 degrees).

In a specific example, during the constant-rate-drying of the electrode substrate, there are a section where a movement angle between the electrode substrate and the horizontal plane increases, a section where the movement angle is maintained, and a section where the movement angle decreases. For example, it is possible for the electrode substrate to sequentially pass through a low movement angle section, a high movement angle section, and a low movement angle section. In another example, it is possible that a low movement angle section and a high movement angle section are repeated 2 to 5 times.

In the present technology, the means for drying the electrode substrate is not particularly limited, and a hot air drying scheme, an induction-heat drying scheme, and an ultraviolet irradiation drying scheme, etc. can be used. The hot air drying scheme can be performed in a manner that supplies heated air, and the heating coil drying scheme is a scheme in which the electrode substrate is directly heated by coils. In the induction-heat drying scheme, the electrode substrate is indirectly heated through induction heating. In addition, the scheme of heating the electrode substrate by irradiating light such as infrared to ultraviolet rays can be applied. In one example, the electrode substrate is dried by one or more of a hot air drying scheme, a heating coil drying scheme, and an induction-heat drying scheme, and a light irradiation drying scheme during the constant-rate-drying of the electrode substrate and the falling-rate-drying of the electrode substrate, respectively.

In one example, an average drying temperature T1 during the constant-rate-drying of the electrode substrate may be set to be lower than an average drying temperature T2 during the falling-rate-drying of the electrode substrate. In the constant-rate-drying step, solvent elements remain in the mixture layer, and when quickly heated at a high temperature, bubbles or cracks, etc. may be generated. In the present technology, for example, the constant-rate-drying step can be performed in the range of 50 to 200° C., and the falling-rate-drying step can performed in the range of 150 to 500° C. Herein, the temperature of the constant-rate-drying step can be controlled to be lower than the temperature of the falling-rate-drying step.

In further another example, the method of drying an electrode according to the present invention further includes preliminary-drying the electrode substrate by heating the electrode substrate before the constant-rate-drying of the electrode substrate. This prevents generation of a surface crack due to a difference in the coefficient of thermal expansion between the mixture layer and the current collector by the rapid heating of the electrode substrate. For example, the preliminary-drying step can be performed in a temperature less than 100° C. or can be performed using an induction heating scheme. By applying an induction heating scheme, it is possible to effectively resolve the stress of the current collector while maintaining the process efficiency. For example, the preliminary-drying step can be performed in the range of 50 to 100° C.

In further another example, the method of drying an electrode according to the present invention further includes: coating an electrode slurry on the electrode substrate by applying the electrode slurry, which contains an active material, a binder polymer, and a solvent, on at least one surface of the electrode substrate, wherein the coating of the electrode slurry, the constant-rate-drying of the electrode substrate, and the falling-rate-drying of the electrode substrate are consecutively or sequentially performed. After applying an electrode slurry on a current collector, the drying step for the electrode substrate can be consecutively performed. Through this, the process efficiency can be enhanced, and the quality uniformity of the electrode can be enhanced. For example, in the drying process, through the conveyor line, the electrode current collector is consecutively moved through the conveyor line, an electrode slurry is applied on the electrode current collector, and a constant-rate-drying step and a falling-rate-drying step are performed.

The electrode drying method of the present technology can be applied when manufacturing an electrode for a secondary battery. In one example, the secondary battery is a lithium secondary battery. The shape of the secondary battery is not particularly limited, and is a pouch type or has a cylindrical structure, and for example, the secondary battery is a cylindrical battery. Further, the electrode is a positive electrode or negative electrode of a secondary battery, for example, a negative electrode for a secondary battery.

The secondary battery includes an electrode assembly including a positive electrode, a negative electrode, and a separator interposed between the positive electrode and the negative electrode; a non-aqueous electrolyte solution impregnating the electrode assembly; and a battery case containing the electrode assembly and the electrolyte solution.

In the present technology, the secondary battery has a structure of including an electrode assembly including a positive electrode, a negative electrode, and a separator interposed between the positive electrode and the negative electrode; a non-aqueous electrolyte solution impregnating the electrode assembly; and a battery case containing the electrode assembly and the non-aqueous electrolyte solution. The non-aqueous electrolyte solution is, for example, an electrolyte solution containing a lithium salt.

The positive electrode has a structure in which a positive electrode active material layer is stacked on both sides of a positive electrode current collector. In one example, the positive electrode active material layer includes a positive electrode active material, a conductive material, and a binder polymer, and if necessary, may further include a positive electrode additive commonly used in the art.

The positive electrode active material may be a lithium-containing oxide, and may be the same or different. A lithium-containing transition metal oxide may be used as the lithium-containing oxide.

For example, the lithium-containing transition metal oxide may be any one or a mixture of two or more selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0<y<1$), $Li_xNi_{1-y}Mn_yO_2$ ($0.5<x<1.3$, $0<y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$), and the lithium-containing transition metal oxide may be coated with a metal or metal oxide such as aluminum (Al). Further, in addition to the lithium-containing transition metal oxide, one or more of sulfide, selenide, and halide may be used.

The positive electrode active material may be included in the range of 94.0 to 98.5 wt % in the positive electrode active material layer. When the content of the positive electrode active material satisfies the above range, it is advantageous in terms of manufacturing a high-capacity battery and providing sufficient conductivity of the positive electrode or adhesion between electrode materials.

The current collector used for the positive electrode is a metal having high conductivity, and any metal which the positive electrode active material slurry may be easily attached to and which is not reactive in the voltage range of the secondary battery can be used. Specifically, non-limiting examples of the current collector for the positive electrode include aluminum, nickel, or a thin film manufactured by a combination thereof.

The positive electrode active material layer further includes a conductive material. The conductive material is usually added in an amount of 1 to 30% by weight based on the total weight of the mixture including the positive electrode active material. Such a conductive material is not particularly limited as long as it has conductivity without causing a chemical change in the secondary battery. For example, graphite such as natural graphite or artificial graphite; carbon black such as carbon black, acetylene black, ketjen black, channel black, furnace black, lamp black, or thermal black; conductive fiber such as carbon fiber or metal fiber; metal powder such as carbon fluoride, aluminum, or nickel powder; conductive whiskey such as zinc oxide or potassium titanate; conductive metal oxide such as titanium oxide; and polyphenylene derivative may be used as the conductive material.

As the binder component, a binder polymer commonly used in the art may be used without limitation. For example, various kinds of binders such as polyvinylidene fluoride-co-hexafluoropropylene (PVDF-co-HFP), polyvinylidene fluoride (PVDF), polyacrylonitrile, polymethyl methacrylate, styrene-butadiene rubber (SBR), and carboxyl methyl cellulose (CMC) may be used.

The content of the binder polymer is proportional to the content of the conductive material included in the upper positive electrode active material layer and the lower positive electrode active material layer. This is to impart adhesion to conductive materials whose particle size is relatively small compared to the active material and is because when the content of the conductive material increases, more binder polymer is required, and when the content of the conductive material decreases, less binder polymer can be used.

The negative electrode has a structure in which a negative electrode mixture layer is stacked on both sides of a negative electrode current collector. In one example, the negative electrode mixture layer includes a negative electrode active material, a conductive material, and a binder polymer, and if necessary, may further include a negative electrode additive commonly used in the art.

The negative electrode active material may include a carbon material, lithium metal, silicon or tin. When a carbon material is used as the negative electrode active material, both low crystalline carbon and high crystalline carbon may be used. Representative examples of low crystalline carbon include soft carbon and hard carbon. Representative examples of high crystalline carbon include natural graphite, Kish graphite, pyrolytic carbon, mesophase pitch based carbon fiber, mesocarbon microbeads, mesophase pitches, and high-temperature calcined carbons such as petroleum or coal tar pitch derived cokes.

Non-limiting examples of the current collector used for the negative electrode include copper, gold, nickel, or a thin film manufactured by a copper alloy or a combination thereof. In addition, the current collector may be used by stacking substrates made of the above materials.

In addition, the negative electrode may include a conductive material and a binder commonly used in the art.

Further, the present technology provides an electrode drying system by using the above described electrode drying method. In one example, a system for drying an electrode according to the present invention includes: a conveyor line which is moved in a state that an electrode substrate, which is obtained by applying an electrode slurry on at least one surface of an electrode current collector, is disposed on the conveyor line; and a heating unit which is located on a moving path of the conveyor line and heats an electrode sheet. Further, the conveyor line includes: a constant-rate-drying section where the conveyor line is moved while forming a tilt angle with a horizontal plane; and a falling-rate-drying section where the conveyor line is horizontally moved, at a region where the conveyor line passes through the heating unit.

In the present technology, an electrode substrate is moved along a conveyor line, and the moving electrode substrate is heated by a heating unit. Further, the region where the conveyor line passes through the heating unit includes: a constant-rate-drying section where the conveyor line is moved while forming a tilt angle with a horizontal plane; and a falling-rate-drying section where the conveyor line is horizontally moved.

Further, in the present technology, the point that the heating unit is located on the moving path of the conveyor line includes the case that the conveyor line passes through a section heated by the heating unit. For example, the conveyor line may pass through the lower side of the heating unit, based on the heating unit which heats the lower portion. The heating unit is located on the moving path, through which the conveyor line passes through. For example, the heating unit may be located at the upper portion, the lower portion and/or the side portion of the conveyor line. Alternatively, the heating unit may cover the path, through which the conveyor line pass through, and the section heated by the heating unit may be sealed by partition walls except for the entrance of the conveyor line.

In one example, the electrode drying system according to the present invention includes an angle adjusting unit which controls a movement angle of the conveyor line. The electrode drying system according to the present technology may preset the movement angle of the conveyor line through a transfer roller, etc. Further, in the present technology, the location of the transfer roller can be controlled or the movement angle of the conveyor line can be directly controlled using an angle adjusting unit. Through this, the movement angle during the drying process can be adjusted according to the drying status of the electrode substrate or the product specification, etc.

DETAILED DESCRIPTION OF THE PREFERRED EMBODIMENTS

Hereinafter, the contents of the present invention are described through examples and drawings, but the following examples are used to illustrate the present invention, and the scope of the present invention is not limited by the scope of the examples and the drawings.

First Embodiment

FIG. 2 is a schematic diagram illustrating a process according to an electrode drying method according to one embodiment of the present invention. Referring to FIG. 2, in the method of manufacturing an electrode according to the present technology, an electrode current collector 101 is supplied by a conveyor line 110. Specifically, the conveyor line 110 is in a state that has been supported and guided by a transfer roller 111. The supplied electrode current collector 101 passes through an electrode slurry discharge unit 120. The electrode slurry discharge unit 120 discharges a negative electrode slurry on the electrode current collector 101. The negative electrode slurry is composed of a negative electrode active material, a conductive material, a binder, and a solvent.

The electrode substrate 100, which has been obtained by coating a negative electrode slurry on an electrode current collector 101, passes through a constant-rate-drying unit 130 where the electrode substrate 100 is dried while moving in a state that has made a tilt angle of 60 degrees with a horizontal plane. The movement angle of the electrode substrate 100 is controlled by the location of a transfer roller 112. The transfer roller 112 can be controlled in a vertical direction by a height adjusting unit (not shown). The constant-rate-drying unit 130 has a structure generated by combining a plurality of constant-rate-drying heaters 131, 132 and 133. The constant-rate-drying step by the constant-rate-drying unit 130 is performed while the electrode substrate 100 passes through the constant-rate-drying unit 130.

The electrode substrate 100, which has passed through the constant-rate-drying unit 130, goes through the falling-rate-drying step in which the electrode substrate 100 is dried while moving in a horizontal direction. In the falling-rate-drying step, the electrode substrate 100 is falling-rate-dried by the falling-rate-drying unit 140. The movement angle of the electrode substrate 100 can be controlled by the location of transfer rollers 113 and 114. The falling-rate-drying unit 140 has a structure generated by combining a plurality of falling-rate-drying heaters 141, 142 and 143.

The electrode substrate 100 having passed through the falling-rate-drying unit 140 is wound by a winding roller (not shown) and is then stored or transferred.

Second Embodiment

FIG. 3 is a schematic diagram illustrating a process according to an electrode drying method according to another embodiment of the present invention. Referring to FIG. 3, in the method of manufacturing an electrode according to the present technology, an electrode current collector 201 is supplied by a conveyor line 210. Specifically, the conveyor line 210 is in a state that has been supported and guided by a transfer roller 211. The supplied electrode current collector 201 passes through an electrode slurry discharge unit 220. The electrode slurry discharge unit 220 discharges a negative electrode slurry on the electrode current collector 201. The negative electrode slurry is composed of a negative electrode active material, a conductive material, a binder, and a solvent.

The electrode substrate 200, which has been obtained by coating a negative electrode slurry on an electrode current collector 201, goes through a first constant-rate-drying step where the electrode substrate 200 is dried while moving in a state that has made a tilt angle of 25 degrees with a horizontal plane, and a second constant-rate-drying step where the electrode substrate 200 is dried while moving in a state that has made a tilt angle of 75 degrees with a horizontal plane. The first and second constant-rate-drying steps are performed while heating and drying the electrode substrate 200 through the constant-rate-drying unit 230.

The movement angle of the electrode substrate 200 is controlled by the location of transfer rollers 212 and 213. The transfer rollers 212 and 213 can be controlled in a vertical direction by a height adjusting unit (not shown). The constant-rate-drying unit 230 has a structure generated by combining a plurality of constant-rate-drying heaters 231, 232, 233 and 234.

The electrode substrate 200, which has passed through the constant-rate-drying unit 230, goes through the falling-rate-drying step in which the electrode substrate 200 is dried while moving in a horizontal direction. In the falling-rate-drying step, the electrode substrate 200 is falling-rate-dried by the falling-rate-drying unit 240. The movement angle of the electrode substrate 200 can be controlled by the location of transfer rollers 214 and 215. The falling-rate-drying unit 240 has a structure generated by combining a plurality of falling-rate-drying heaters 241, 242 and 243.

The electrode substrate 200 having passed through the falling-rate-drying unit 240 is wound by a winding roller (not shown) and is then stored or transferred.

Third Embodiment

FIG. 4 is a schematic diagram illustrating a change in the shape and components of an electrode slurry during a constant-rate-drying step according to one embodiment of the present invention. Referring to FIG. 4, the electrode substrate 300 has a structure where an electrode mixture layer 310 containing an electrode slurry has been applied on an electrode current collector 301 formed of a copper foil. The electrode substrate 300 goes through the constant-rate-drying step where the electrode substrate 300 is dried while moving in a state that forms a tilt angle of 30 degrees with a horizontal plane. The electrode mixture layer 310 has a structure that graphite elements as the electrode active material 311, the binder 312 and the conductive material (not shown) are dispersed in a solvent 313. As time goes by in the constant-rate-drying step, the solvent elements are evaporated, and the thickness of the electrode mixture layer 310 decreases. During the constant-rate-drying step, the solvent is evaporated, and binder 312 elements having a relatively small specific gravity are also moved upward. However, since the electrode substrate 300 is moved in a state that has made a tilt angle with a horizontal plane, the binder 312 in the electrode mixture layer 310 is moved upward along the path which has become relatively long. Through this, it is possible to suppress the movement of the binder 312 toward the surface side of the electrode mixture layer 310 while the drying process is performed.

In the above, the present invention has been described in more detail through the drawings. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS 100, 200, 300: electrode substrate
101, 201, 301: electrode current collector 110, 210: conveyor line
111, 112, 113, 114, 211, 212, 213, 214, 215: transfer roller
120, 220: electrode slurry discharge unit
130, 230: constant-rate-drying unit
131, 132, 133, 231, 232, 233, 234: constant-rate-drying heater
140, 240: falling-rate-drying unit
141, 142, 143, 241, 242, 243: falling-rate-drying heater
310: electrode mixture layer
311: electrode active material
312: binder
313: solvent

The invention claimed is:

1. A method for drying an electrode, the method comprising:
constant-rate-drying an electrode substrate coated with an electrode slurry while the electrode substrate is moved in a state that the electrode substrate makes a tilt angle with a horizontal plane; and
falling-rate-drying the electrode substrate while the electrode substrate is horizontally moved,
wherein the constant-rate-drying includes n sections,
wherein a movement angle in a p-th section and a movement angle in a q-th section satisfy following condition 1:

$$|\theta p - \theta Q| > 10(°),\qquad \text{[Condition 1]}$$

wherein the θp denotes the movement angle in the p-th section,
wherein θq denotes the movement angle in the q-th section,
wherein the n is an integer equal to or greater than 2, and
wherein each of the p and the q is an integer between 1 and the n, and the p is different from the q.

2. The method of claim 1, wherein during the constant-rate-drying of the electrode substrate, a movement angle between the electrode substrate and the horizontal plane is in a range of 10 to 350 degrees.

3. The method of claim 1, wherein during the constant-rate-drying of the electrode substrate, there are: (i) a section where a movement angle between the electrode substrate and the horizontal plane increases, (ii) a section where the movement angle is maintained, and (iii) a section where the movement angle decreases.

4. The method of claim 1, wherein the electrode substrate is dried by one or more of a hot air drying scheme, a heating coil drying scheme, or an induction-heat drying scheme during the constant-rate-drying of the electrode substrate; and the electrode substrate is dried by a light irradiation drying scheme during the falling-rate-drying of the electrode substrate.

5. The method of claim 1, wherein an average drying temperature T1 during the constant-rate-drying of the electrode substrate is lower than an average drying temperature T2 during the falling-rate-drying of the electrode substrate.

6. The method of claim 1, further comprising preliminary-drying the electrode substrate by heating the electrode substrate before the constant-rate-drying of the electrode substrate.

7. The method of claim 1, further comprising: coating an electrode slurry on the electrode substrate by applying the electrode slurry, which contains an active material, a binder polymer, and a solvent, on at least one surface of the electrode substrate,
wherein the coating of the electrode slurry, the constant-rate-drying of the electrode substrate, and the falling-rate-drying of the electrode substrate are consecutively.

8. The method of claim 1, wherein the electrode is a negative electrode.

9. The method of claim 1, further comprising: coating an electrode slurry on the electrode substrate by applying the electrode slurry, which contains an active material, a binder polymer, and a solvent, on at least one surface of the electrode substrate,
wherein the coating of the electrode slurry, the constant-rate-drying of the electrode substrate, and the falling-rate-drying of the electrode substrate are sequentially performed.

10. A system for drying an electrode, the system comprising:
a conveyor line which is configured to be moved in a state that an electrode substrate, which is obtained by applying an electrode slurry on at least one surface of an electrode current collector, is disposed on the conveyor line; and
a heating unit which is located on a moving path of the conveyor line is configured to heat an electrode sheet,
wherein the conveyor line includes:
a constant-rate-drying section where the conveyor line is configured to be moved while forming a tilt angle with a horizontal plane; and
a falling-rate-drying section where the conveyor line is configured to be horizontally moved, at a region where the conveyor line passes through the heating unit, and
wherein the constant-rate-drying section includes n sections,
wherein a movement angle in a p-th section and a movement angle in a q-th section satisfy following condition 1:

$$|\theta p - \theta q| > 10(°),\qquad \text{[Condition 1]}$$

wherein the θp denotes the movement angle in the p-th section,
wherein θq denotes the movement angle in the q-th section,
wherein the n is an integer equal to or greater than 2, and
wherein each of the p and the q is an integer between 1 and the n, and the p is different from the q.

11. The system of claim 10, further comprising an angle adjusting unit which is configured to control a movement angle of the conveyor line.

* * * * *